United States Patent [19]
Hirano et al.

[11] Patent Number: 5,649,191
[45] Date of Patent: Jul. 15, 1997

[54] INFORMATION SEARCHING APPARATUS FOR MANAGING AND RETRIEVING DOCUMENT DATA STORED IN A STORAGE UNIT

[75] Inventors: Toshinori Hirano, Chikushino; Nobuyuki Baba, Fukuoka; Yutaka Takahashi, Kawasaki; Isao Inagawa, Yamato, all of Japan

[73] Assignees: Matsushita Electric Industrial Co., Ltd., Osaka; Fuji Photo Film Co., Ltd., Kanagawa-ken, both of Japan

[21] Appl. No.: 52,987

[22] Filed: Apr. 27, 1993

[30] Foreign Application Priority Data

Apr. 30, 1992 [JP] Japan ................................. 4-111128

[51] Int. Cl.$^6$ ..................................................... G06F 17/30
[52] U.S. Cl. ............................ 395/613; 395/611; 395/616; 395/348; 395/942; 395/968
[58] Field of Search ............................. 395/600, 159, 395/160, 419.19, 613, 616; 364/419.19

[56] References Cited

U.S. PATENT DOCUMENTS

| | | | |
|---|---|---|---|
| 4,437,127 | 3/1984 | Hirose | 358/296 |
| 4,611,298 | 9/1986 | Schuldt | 364/419.19 |
| 4,653,021 | 3/1987 | Takagi | 395/600 |
| 4,945,475 | 7/1990 | Bruffey et al. | 395/600 |
| 4,980,842 | 12/1990 | Kamada et al. | 395/425 |
| 4,999,790 | 3/1991 | Murayama et al. | 395/146 |
| 5,065,347 | 11/1991 | Pajak et al. | 395/159 |
| 5,247,437 | 9/1993 | Vale et al. | 364/419.19 |
| 5,247,666 | 9/1993 | Bockwold | 395/600 |
| 5,280,609 | 1/1994 | MacPhail | 395/600 |
| 5,297,253 | 3/1994 | Meisel | 395/160 |
| 5,321,831 | 6/1994 | Hirose | 395/600 |
| 5,388,196 | 2/1995 | Pajak et al. | 395/153 |
| 5,418,946 | 5/1995 | Mori | 395/600 |

*Primary Examiner*—Paul V. Kulik
*Assistant Examiner*—Hosain T. Alam
*Attorney, Agent, or Firm*—Lowe, Price, LeBlanc & Becker

[57] ABSTRACT

An information searching apparatus for managing and retrieving document data stored in a storage unit. The storage unit further comprises a managing information storage section for storing document managing information for managing the document data stored. The apparatus sets the document managing information in the managing information storage section in accordance with a type of data managing system and retrieves the stored document data on the basis of the document managing information set in the managing information storage section. Further, the apparatus has a function to change the type of data managing system to a different type of data managing system so that the document data stored are managed and retrieved in accordance with the data managing system changed. The apparatus can effectively manage data such that the document data is managed in accordance with a type of data managing system suitable for a kind of document and a work purpose.

2 Claims, 17 Drawing Sheets

FIG. 7

| ⋮ |
|---|
| CHARGE FOR COMMUNICATION |
| 5 |
| 0 |
| 6 |
| 1 |
| 0 |
| REPORT |
| 6 |
| 5 |
| 7 |
| 0 |
| 9 |
| TECHNICAL REPORT |
| 7 |
| 6 |
| (DOCUMENT id) |
| 0 |
| 8 |
| ARTICLE 1 |
| 8 |
| 6 |
| (DOCUMENT id) |
| 7 |
| 0 |
| ARTICLE 2 |
| 9 |
| 5 |
| 10 |
| 6 |
| 0 |
| TRAVELING REPORT |
| 10 |
| 9 |
| (DOCUMENT id) |
| 0 |
| 0 |
| EXTERNAL STUDY |
| |
| ⋮ |

71 : rows 5, 0, 6, 1, 0, REPORT
72 : rows 6, 5, 7, 0, 9, TECHNICAL REPORT
73 : rows 7, 6, (DOCUMENT id), 0, 8, ARTICLE 1
74 : rows 8, 6, (DOCUMENT id), 7, 0, ARTICLE 2
75 : rows 9, 5, 10, 6, 0, TRAVELING REPORT
76 : rows 10, 9, (DOCUMENT id), 0, 0, EXTERNAL STUDY

| NO. | GROUP | | |
|---|---|---|---|
| | SEAT | CHARGE | USED CARD |
| 1 | TOKYO | ~ 6.000 YEN | A CO, LTD |
| 2 | OSAKA | ~ 8.000 YEN | B CO, LTD |
| 3 | FUKUOKA | ~10.000 YEN | C CO, LTD |
| 4 | OKINAWA | ~15.000 YEN | D CO, LTD |
| 5 | | ~20.000 YEN | E CO, LTD |
| 6 | | ~25.000 YEN | |

FIG. 10

KEYWORD LIST TABLE

| | |
|---|---|
| ⋮ | ~81 |
| FUKUOKA | |
| 6 | ← KEYWORD id |
| C | ← GROUP id |
| C CO, LTD | ← KEYWORD NAME |
| 7 | |
| A | |
| OKINAWA | |
| 8 | |
| B | |
| ~ 8.000 YEN | |
| 9 | |
| B | |
| ~10.000 YEN | |
| 10 | |
| C | |
| D CO, LTD | |
| 11 | |
| C | |
| E CO, LTD | |
| 12 | |
| ⋮ | |

KEYWORD GROUP LIST TABLE

| | |
|---|---|
| A | ← GROUP id |
| SEAT | ← GROUP NAME |
| B | |
| CHARGE | |
| C | |
| USED CARD | ~82 |

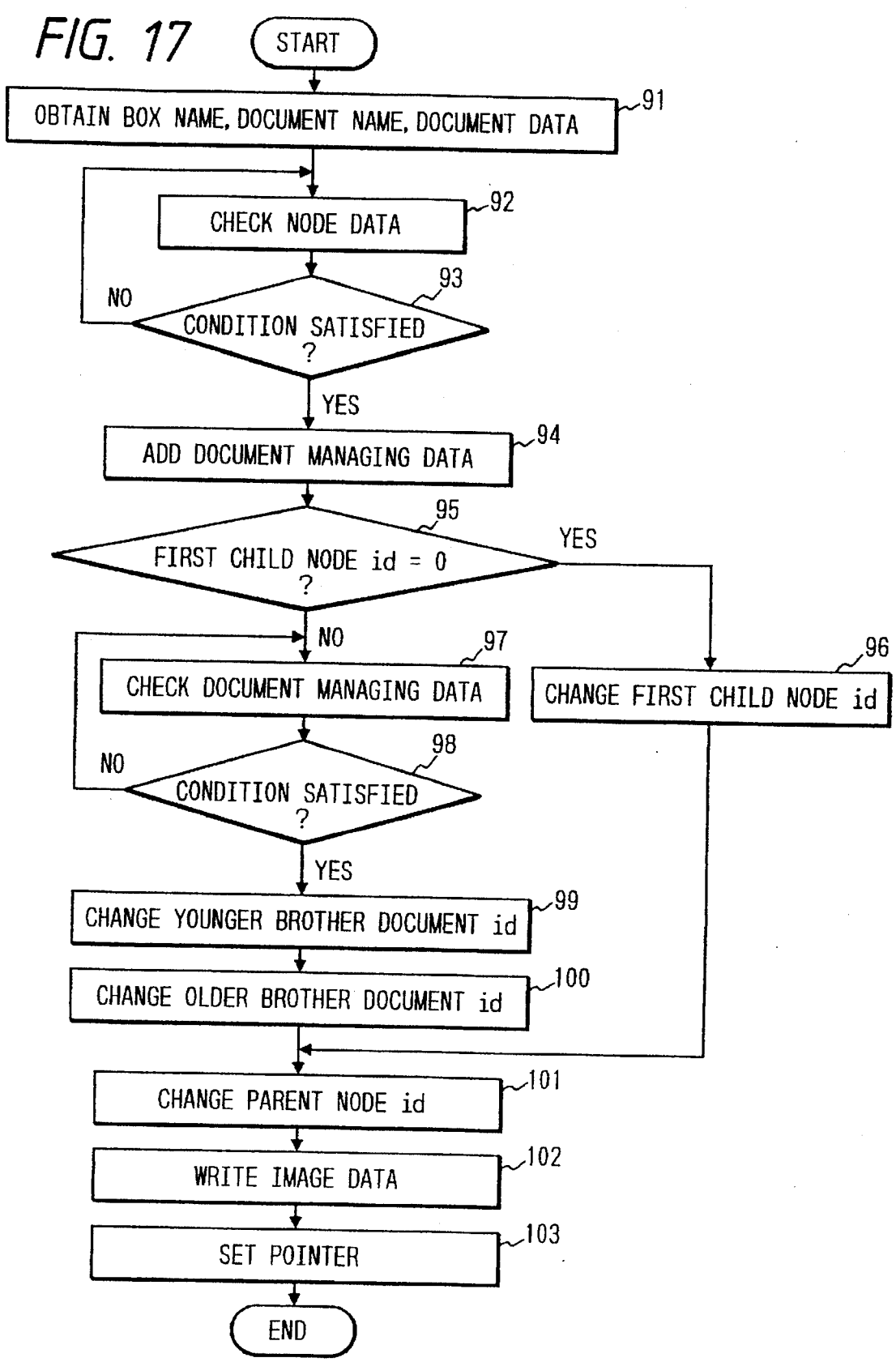

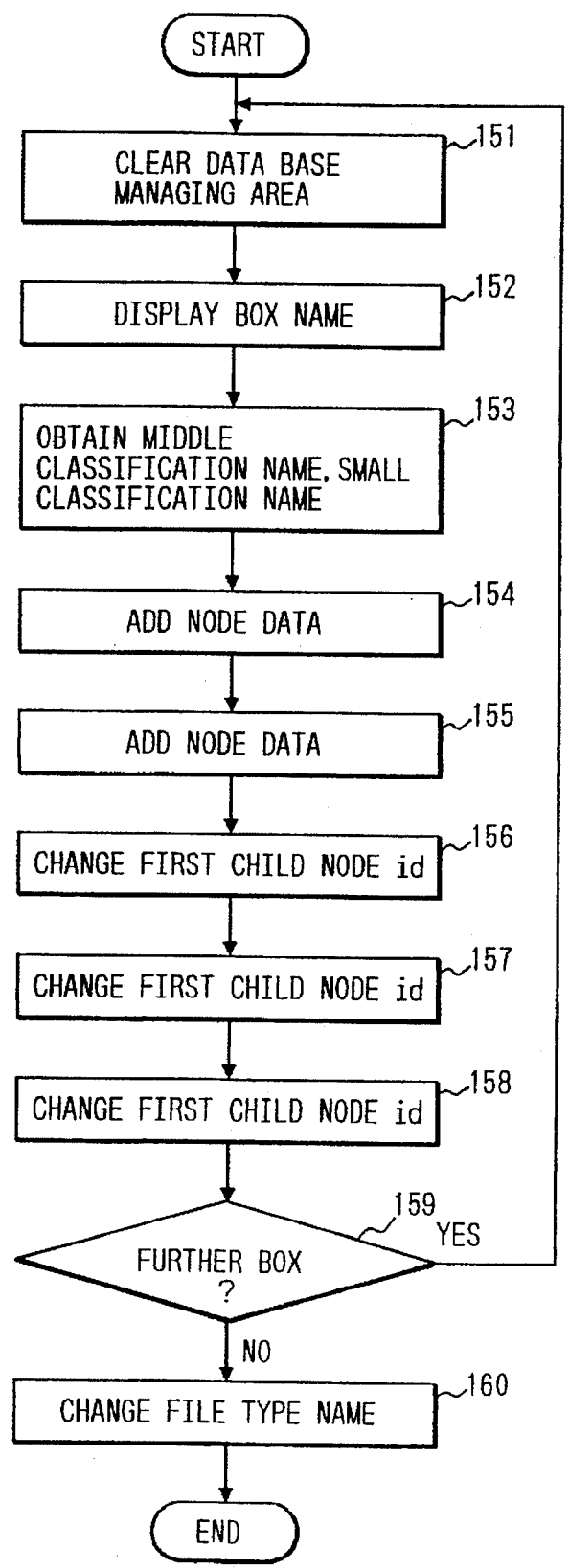

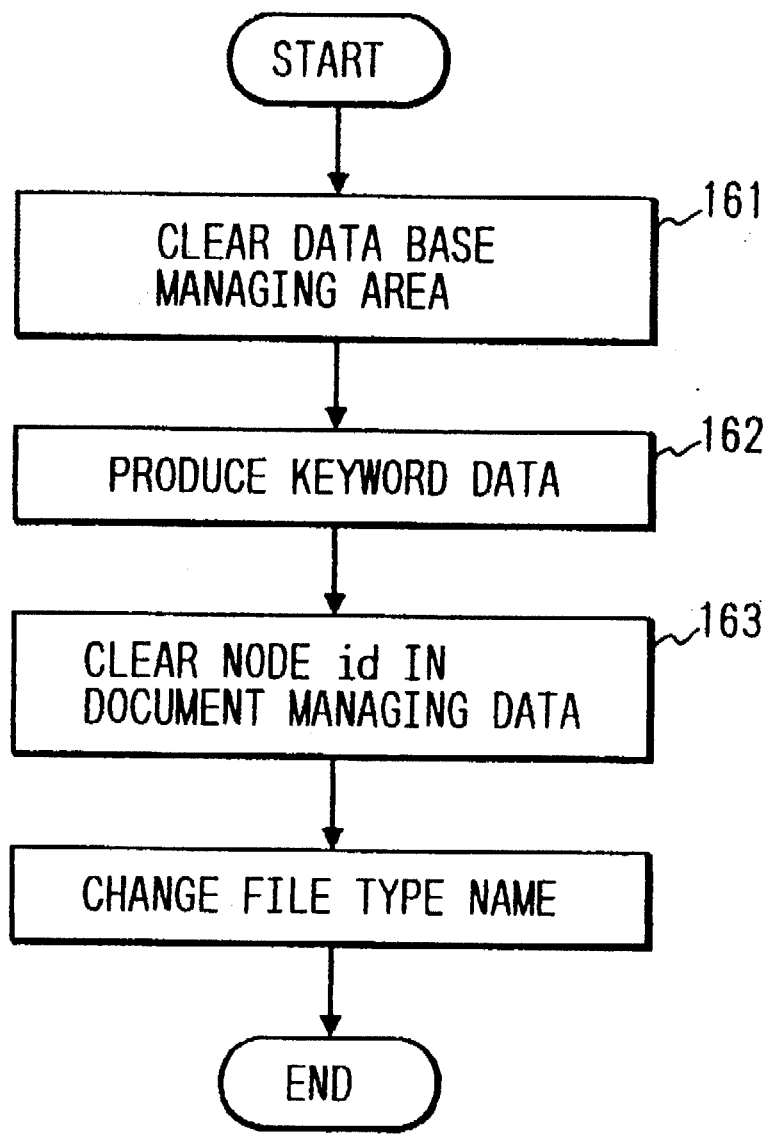

1

INFORMATION SEARCHING APPARATUS FOR MANAGING AND RETRIEVING DOCUMENT DATA STORED IN A STORAGE UNIT

BACKGROUND OF THE INVENTION

The present invention relates to an information searching apparatus for effectively managing and retrieving documents.

Recently, an information searching technique is being widely used which inputs documents as image data to classify the documents and store the classified documents in a large-capacity storage medium. A conventional information searching apparatus is arranged such that the user effects the document management in accordance with a predetermined data base system such as a hierarchical document managing arrangement based on items designated by the user. However, according to this conventional information searching apparatus, the user is forced to use the predetermined data base system whereby difficulty is encountered to manage the documents in consideration of the kinds of documents. In addition, such a data base system is not easy for the general users and not simple for designating the classification name and keyword at the time of the registration. Thus, an improvement would be required from the viewpoint of presenting an easy operating environment usable.

SUMMARY OF THE INVENTION

It is therefore an object of the present invention to provide an information searching apparatus which is capable of freely managing documents in accordance with the kinds of documents and improving the operability.

According to this invention, an information searching apparatus includes document data storage means for storing document data, managing information storage means for storing managing information for managing the document data stored in the document data storage means and managing system type storage means for storing information indicative of a type of document managing system, and sets the document managing information in the managing information storage means in accordance with the document managing system type information stored in the managing system type storage means. The retrieval of the document data of the document data storage means is effected on the basis of the document managing information set in the managing information storage means. Preferably, the apparatus further comprises indicating means for indicating a change of the document managing system type information stored in the managing system type storage means and changing means for changing the type of the document managing system stored in the managing system type storage means to a different type of document managing system in accordance with the indication from the indicating means so as to set the document managing information in the managing information storage means in accordance with the document managing system changed.

BRIEF DESCRIPTION OF THE DRAWINGS

The object and features of the present invention will become more readily apparent from the following detailed description of the preferred embodiments taken in conjunction with the accompanying drawings in which.

2

Figure 2:
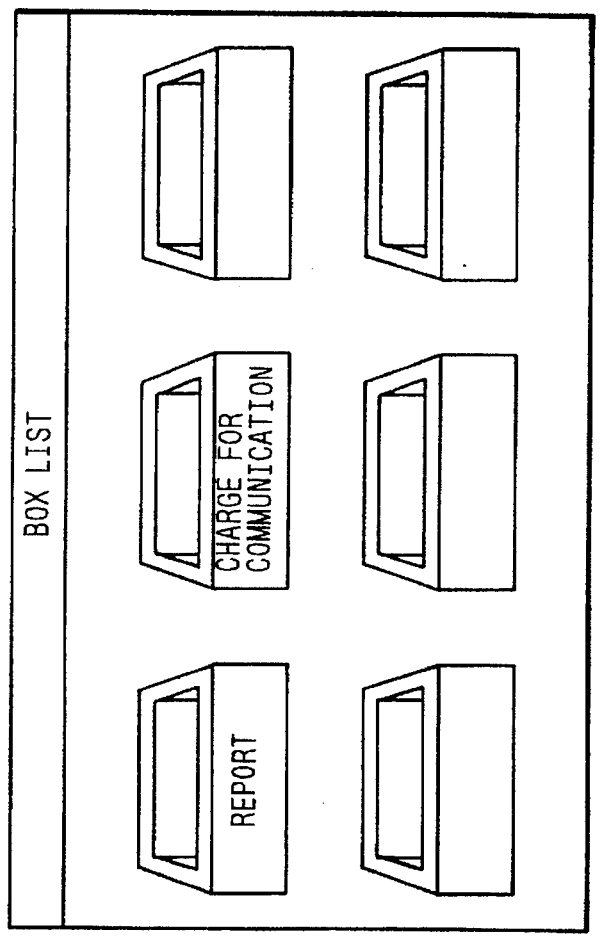
Figure 3:
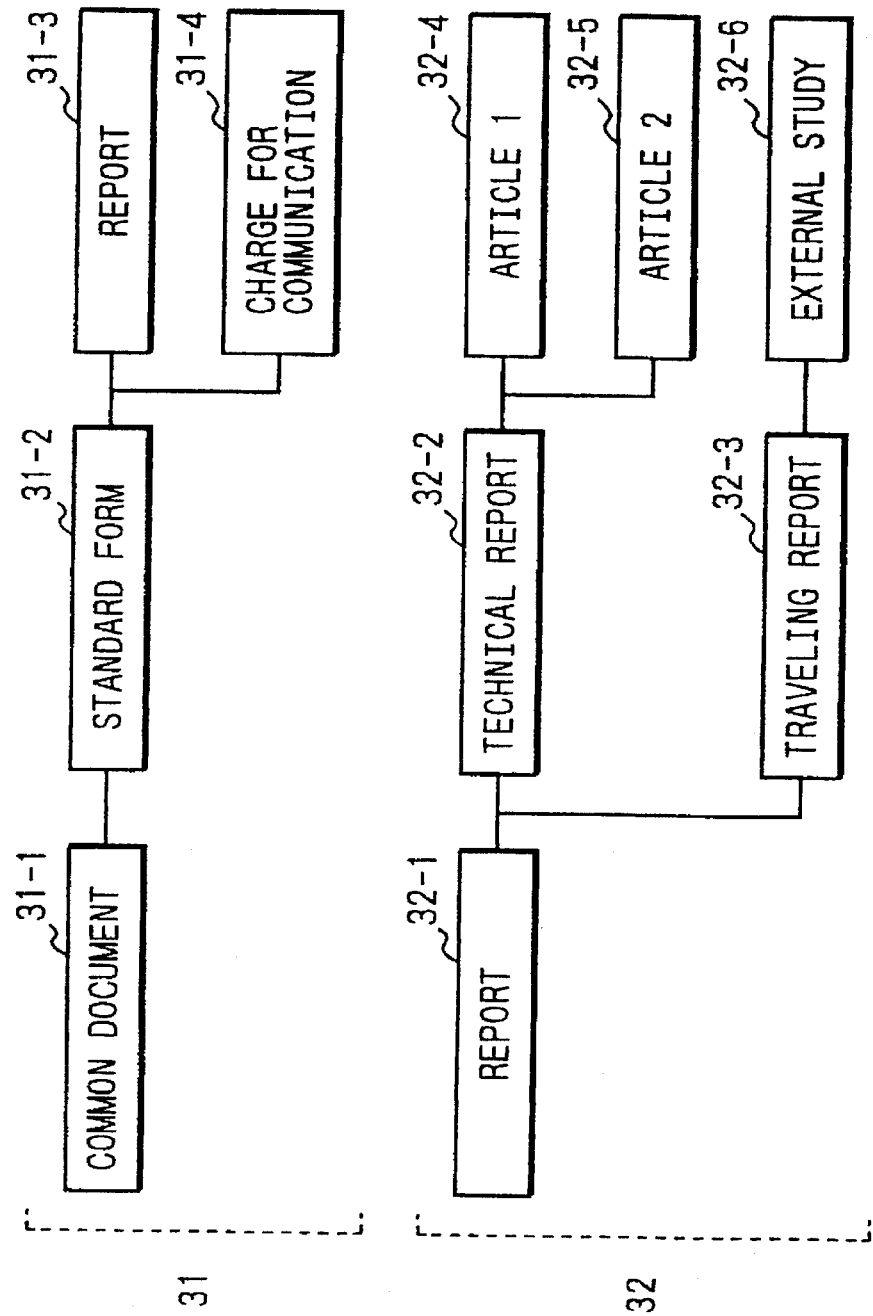
Figure 4:
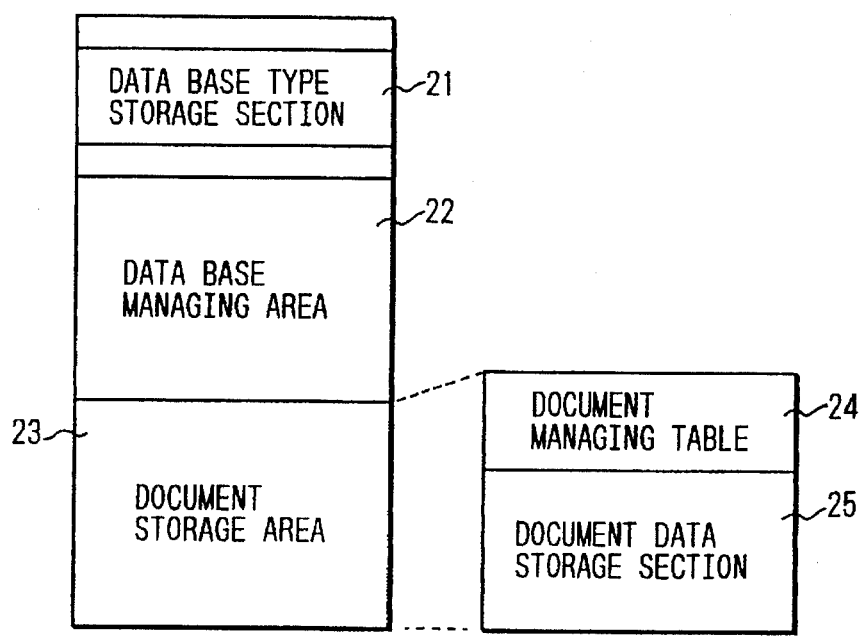
Figure 5:
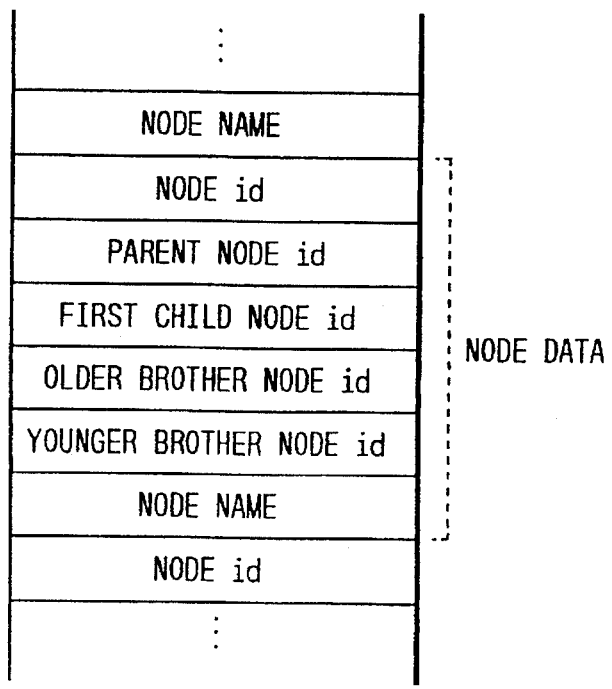
Figure 6:
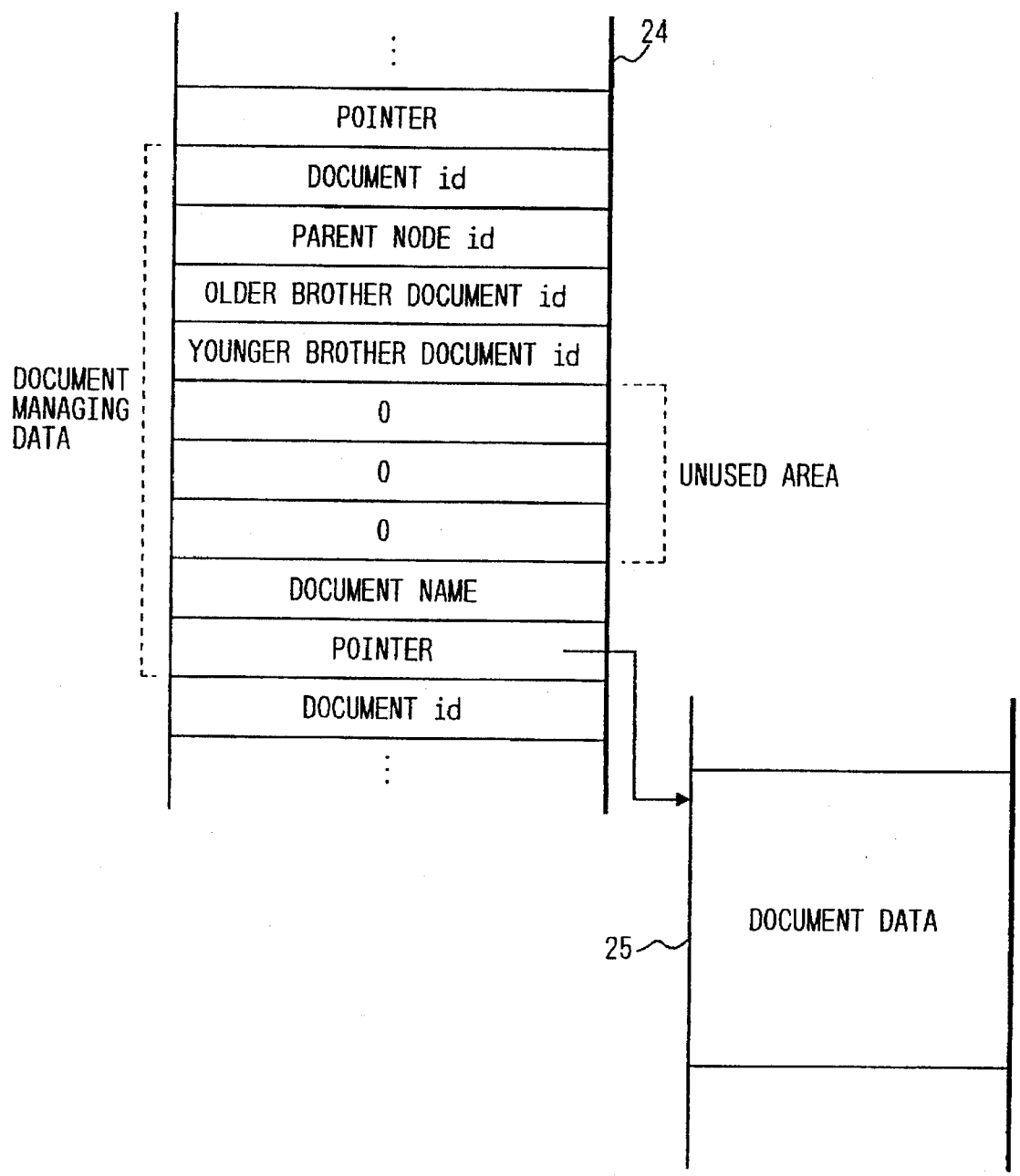
Figures 8, 9:
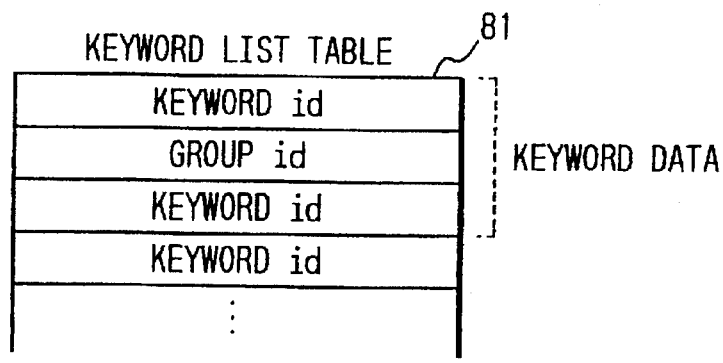
Figure 11:
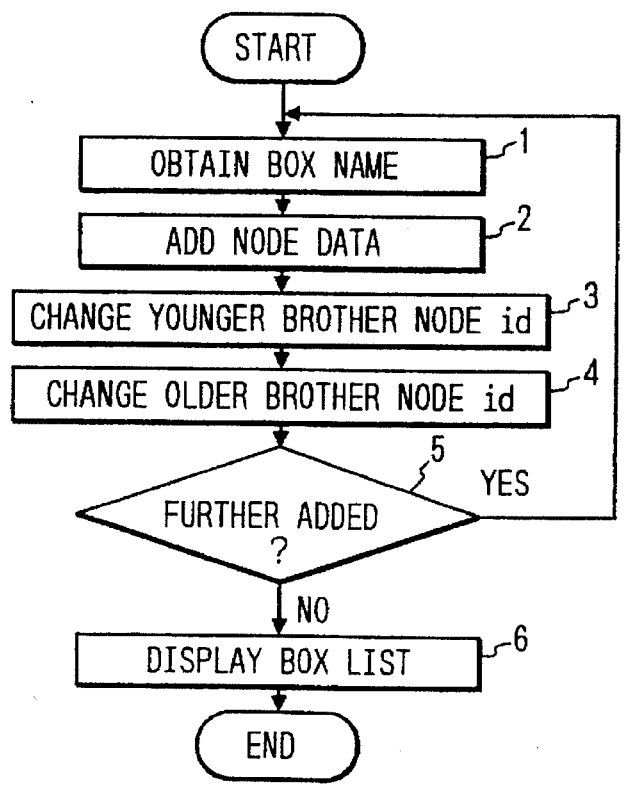
Figure 13:
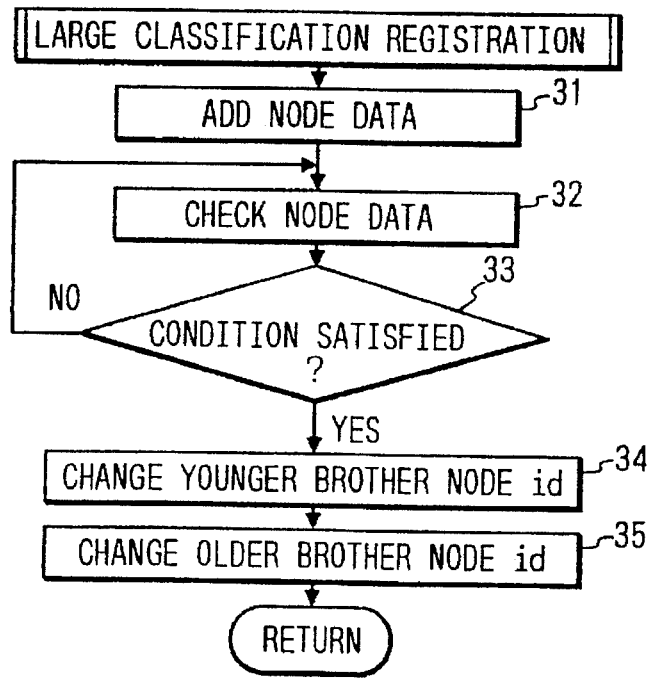
Figure 12:
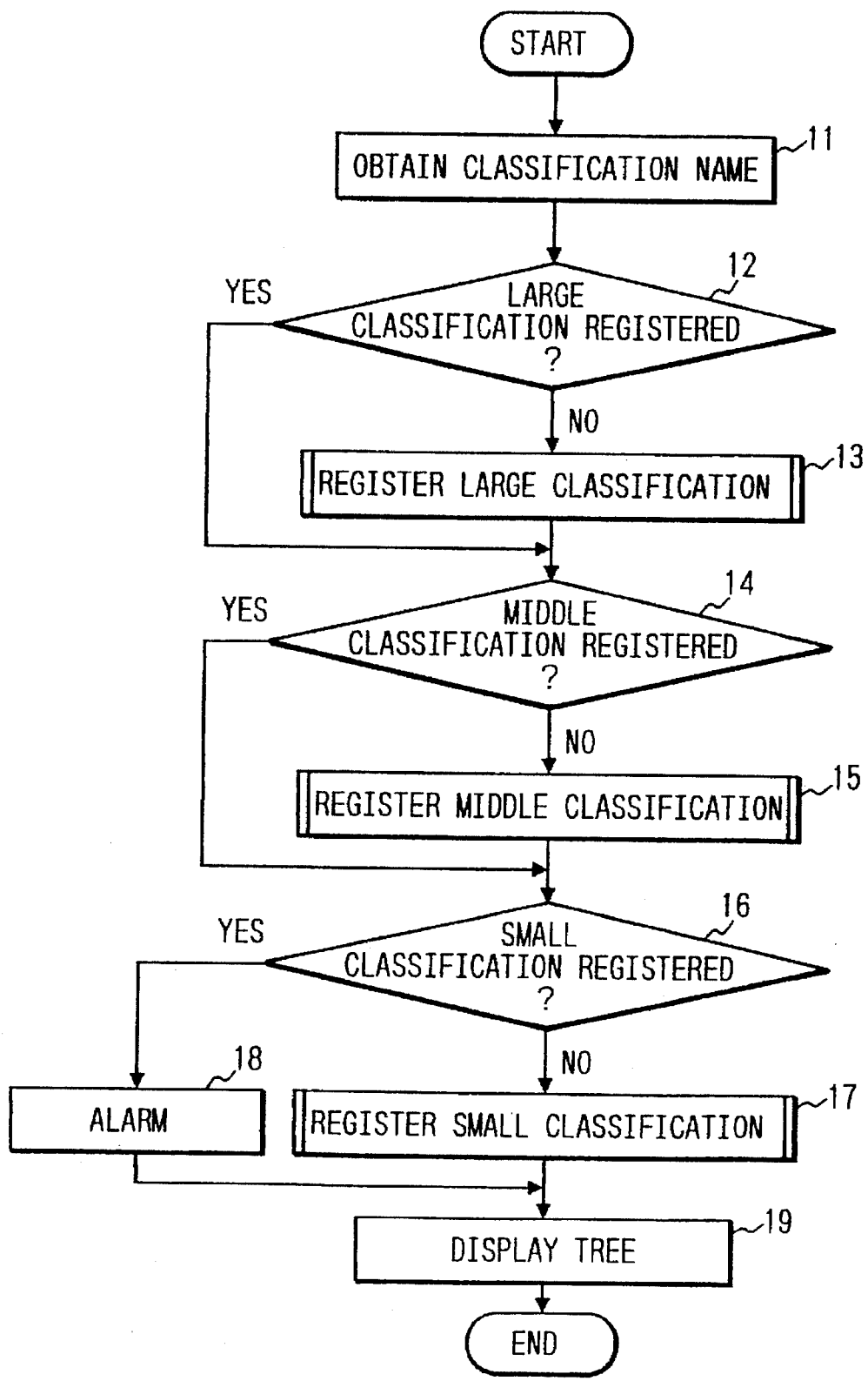
Figure 14:
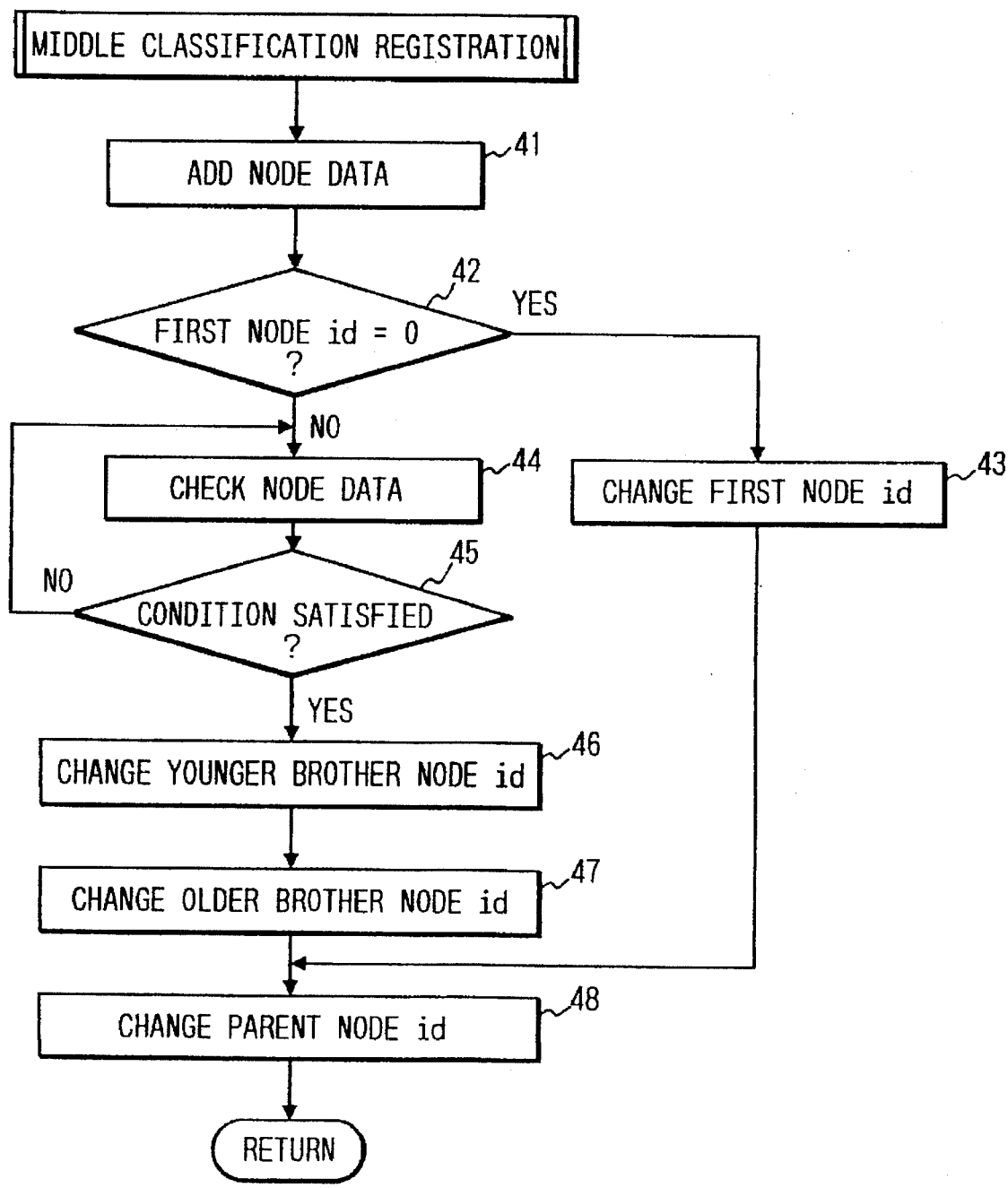
Figure 15:
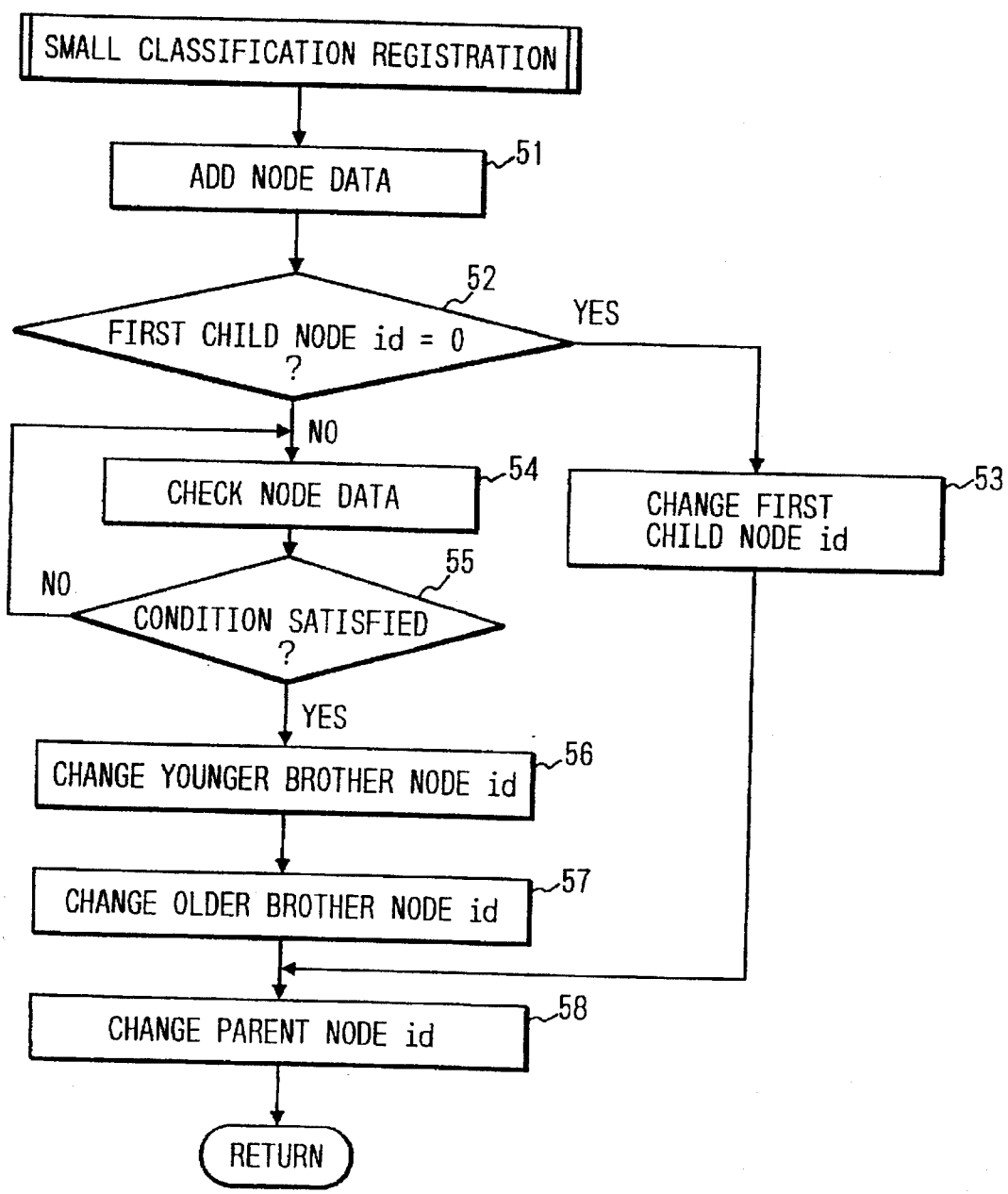
Figure 16:
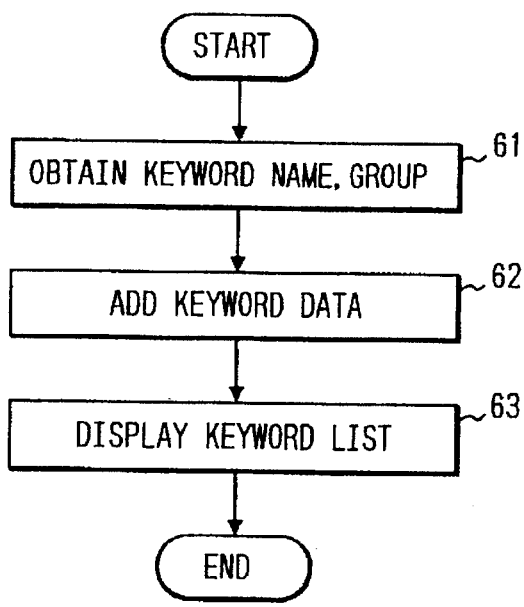
Figure 20:
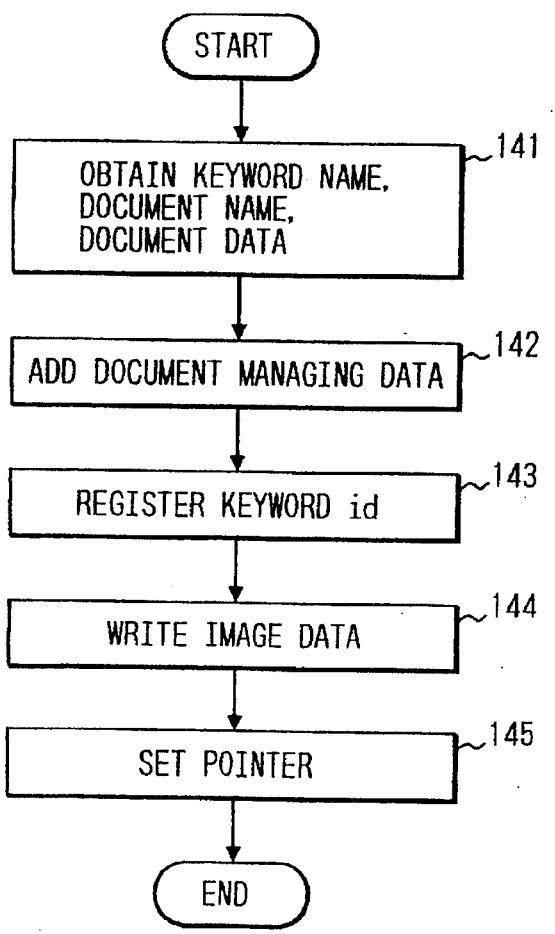
Figure 18:
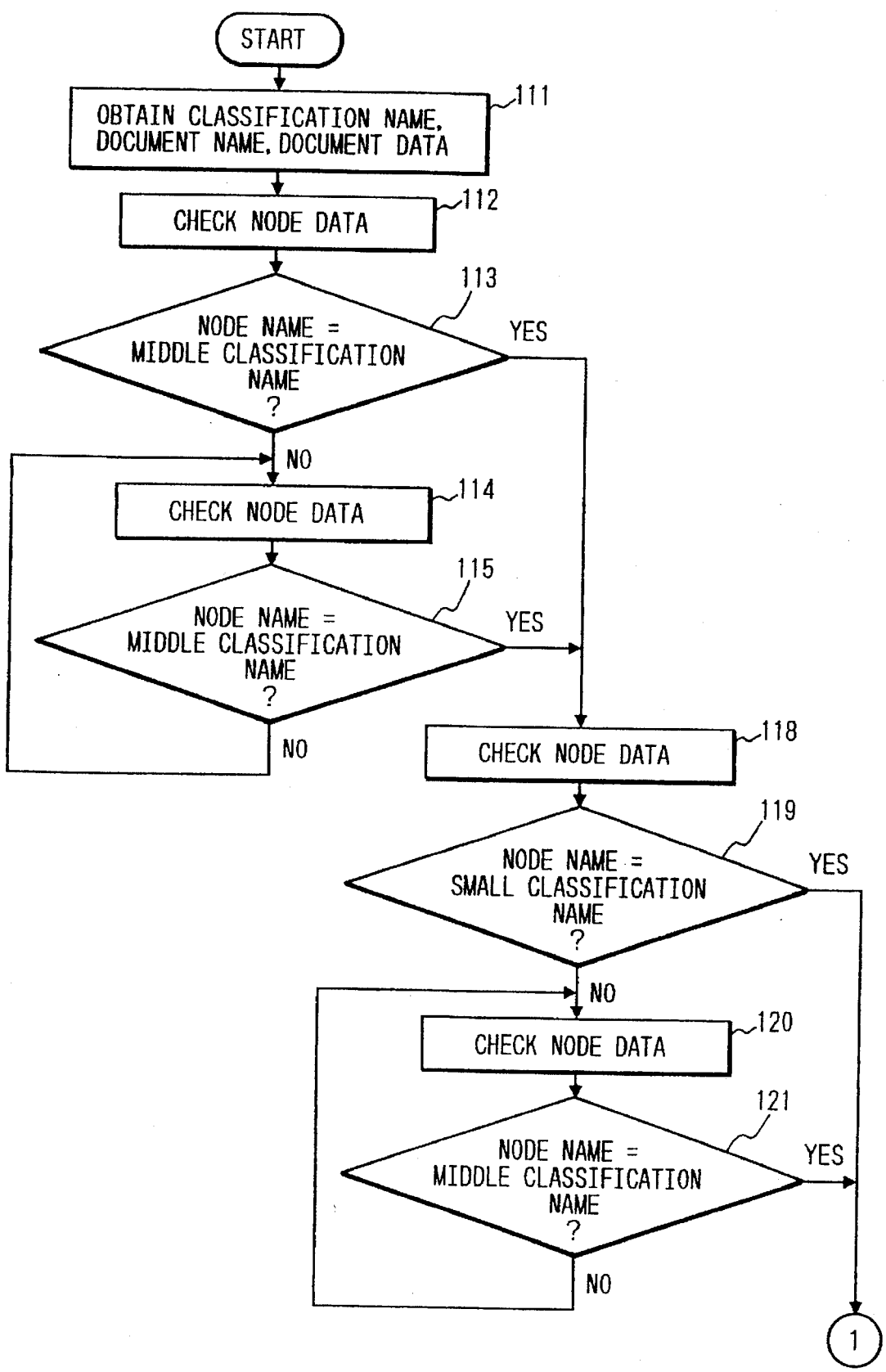
Figure 19:
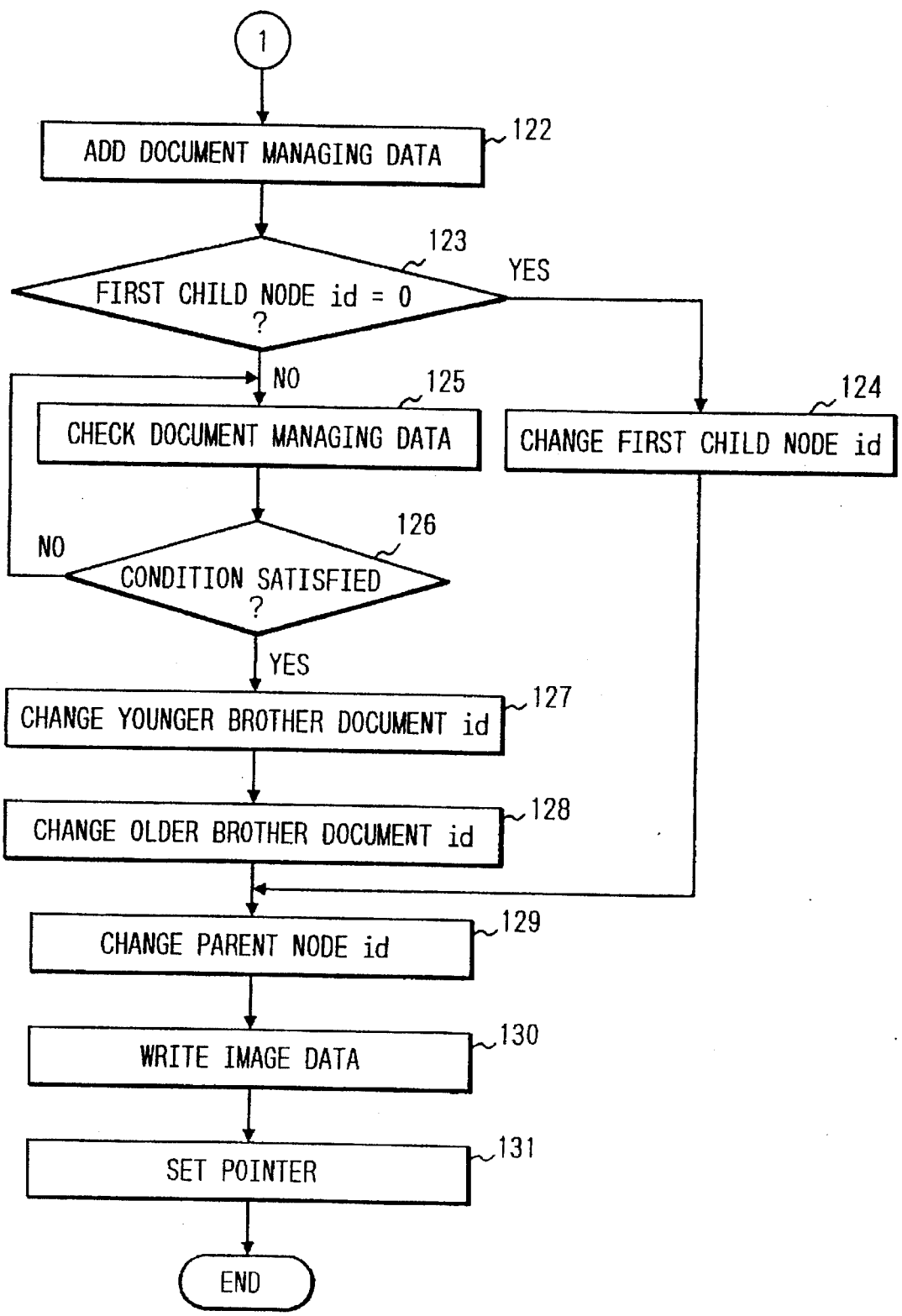

FIG. 2 is an illustration of an example of a list of boxes to be used for the information searching apparatus according to this embodiment;

FIG. 3 is an illustration of an example of a tree structure to be used for the information searching apparatus according to this embodiment;

FIG. 4 shows an arrangement of a large-capacity storage unit in the information searching apparatus of this embodiment;

FIG. 5 is an illustration of an arrangement of node data in this embodiment;

FIG. 6 is an illustration of data arrangement in a document managing table and a document data storage section of the information searching apparatus of this invention;

FIG. 7 is an illustration for describing a tree type document managing system in this embodiment;

FIG. 8 is an illustration of a data arrangement of a keyword type document managing system in this embodiment;

FIG. 9 is an illustration of an example of a keyword list;

FIG. 10 is an illustration of a data arrangement of a keyword type document managing system in this embodiment;

FIG. 11 is a flow chart showing a registration process in a box type document managing system in this embodiment;

FIG. 12 is a flow chart showing a tree production process in this embodiment;

FIG. 13 is a flow chart showing a registration process for a large classification in this embodiment;

FIG. 14 is a flow chart showing a registration process for a middle classification in this embodiment;

FIG. 15 a flow chart showing a registration process for a small classification in this embodiment;

FIG. 16 is a flow chart showing a registration process of a keyword in this embodiment;

FIG. 17 is a flow chart showing a document registration process to a box type data base in this embodiment;

FIGS. 18 and 19 shows a flow chart for a document registration process to a tree type data base in this embodiment;

FIG. 20 shows a flow chart for a document registration process to a keyword type data base;

FIG. 21 shows a flow chart for a changing process from a box type data base to a tree type data base; and FIG. 22 shows a flow chart for a changing process from a box type data base to a keyword type data base.

DETAILED DESCRIPTION OF THE INVENTION

Figure 1:
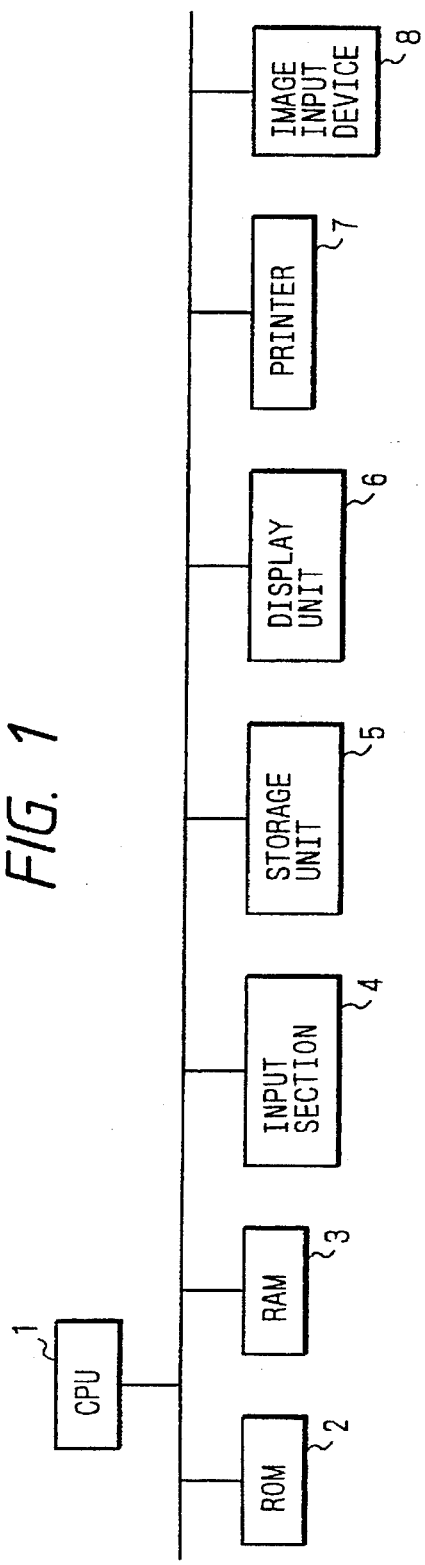
FIG. 1 is a block diagram showing an entire arrangement of an information searching apparatus according to an embodiment of this invention.

FIG. 1 is a block diagram showing an arrangement of an information searching apparatus according to an embodiment of this invention. The apparatus includes a central processing unit (which will be referred hereinafter to as a CPU) 1 for control and data processing, which operates in accordance with a program stored in a read-only memory (which will be referred hereinafter to as a ROM) 2. Also included in this apparatus are a random access memory (which will be referred hereinafter to as a RAM) 3, an input section such as a keyboard and a mouse 4, a large-capacity storage unit 5, a display unit 6, a printer 7 and an image inputting unit 8 which are respectively coupled through a common bus to the CPU 1. The large-capacity storage unit 5 is for storing document data by using a large-capacity storage medium such as an optical magnetic disc. The document data to be stored in the large-capacity storage unit 5 are managed in accordance with the classification names and keywords given. In this embodiment, as managing methods there are used three kinds of managing methods: the first being the method (box type method) that the document data is managed in accordance with the one-hierarchical classification names given, the second being the method (tree type method) that the document data is managed in accordance with the multi-hierarchical classification names given, and the third being the method (keyword type method) that the document data is managed with a plurality of keywords being given to each of the documents. In the box type managing method, as shown in FIG. 2, a plurality of boxes named are displayed on the display unit 6 and the user successively puts documents into the corresponding boxes at the time of registration of the documents. This operation is extremely simple. In the tree type managing method, three hierarchies comprising a large classification, a middle classification and a small classification are provided and displayed as a tree structure on the display unit 6 as shown in FIG. 3. Further, in the keyword type managing method, the user previously gives a keyword registered to each of the documents and designates a desired keyword at the time of retrieval of the document to retrieve the corresponding document.

In the large-capacity storage unit 5, as illustrated in FIG. 4, at the initial time there are set a data base type storage section 21 for storing the information indicative of the type of the managing method (the box type, tree type or keyword type managing method) by which the data in the disc is managed, a data base managing area 22 having a structure inherent to the type of the data base and a document storage area 23 for storing the document data. Further, in the document storage area 23 there are provided a document managing table 24 and a document storage section 25. These basic memory maps are common to the respective types of the data bases. For initializing the disc in the large-capacity storage unit 5, the CPU 1 writes the data base type (box type, tree type or keyword type) of the disc in the data base type storage section 21 in accordance with an instruction inputted from the inputting section 4.

A description will be made hereinbelow in terms of a data structure taken at every data base type. In the case of the box type, as shown in FIG. 5, node data is provided at every box in the data base managing area 22. Further, as shown in FIG. 6, document managing data is provided at every document in the document managing table 24, and the document data in the document data storage section 23 is specified by a pointer of the document managing data. The node data comprises a node id, a parent node id, a first child node id, an older brother id, a younger brother id and a node name (box name). As the node id, a serial number is automatically given in order of production of the box. Further, the document id (which will be described hereinafter) of the document firstly registered in that box is stored as the first child node id, the node id of the box registered immediately before that box is stored as the older brother node id, and the node id of the box registered immediately after that box is stored as the younger brother node id. The node id of a node in the hierarchy which is higher by one to which that node belongs is stored as the parent node id, while, since the management is made within one hierarchy in the case of the box type, the parent node id becomes "0" in terms of all the nodes. Moreover, if that box is a box firstly registered, the older brother node id of that node data becomes "0", and if being a box lastly registered, the younger brother node id of that node data becomes "0".

The document managing data comprises a document id, a parent node id, an older brother document id, a younger brother document id, a document name, and a pointer to the document data. For the document id, a serial number is automatically given in order of registration of the document. The document id is arranged to be different from the node id, for example, with a specific bit of a byte being arranged to be different from that of the node id. The node id of the box to which that document belongs is stored in the parent node id, the document id of the document registered immediately before that document is stored in the older brother document id, and the document id of the document registered immediately after that document is stored in the younger brother document id. Here, in the case that that document is a document firstly registered, the older brother document id of that document managing data becomes "0", and in the case that that document is a document lastly registered, the younger brother document id of that document managing data becomes "0". Further, as obvious in FIG. 6, an area of the document managing data is ensured so as to cope with the other data base type, and in the case of the box type, the area is not used.

Secondly, a description will be made hereinbelow in terms of a data structure in the case of the tree type. Although the tree type is basically similar in data structure to the box type, since in the tree type the node has a hierarchical structure, of the node data the parent node id becomes the node id of the node in the high order hierarchy which belongs to that node. Further, the first child node id becomes the node id of the node which is included in the nodes in the lower order hierarchy belonging to that node and which is firstly registered.

The node ids of the nodes which are included in the nodes belonging to the same node and which are registered immediately before and immediately after that node are respectively stored in the older brother node id and the younger brother node id. In terms of the nodes firstly and lastly registered, the older brother node id and the younger brother node id respectively become "0". Here, in the node data of the lowest hierarchy node (small classification), the document id of the document which is included in the documents belonging to that node and which is firstly registered is stored in the first child node id.

In the case of the tree 32 shown in FIG. 3, the data base managing area 22 becomes as illustrated in FIG. 7. In FIG. 7, a node data 71 corresponds to the node 32-1 in FIG. 3. Similarly, node data 72, 73, 74, 75 and 76 correspond to the nodes 32-2, 32-4, 32-5, 32-3 and 32-6, respectively. For example, in the case of the node 32-2 indicative of "Technical Report", in the corresponding node data 72 the node id becomes "6", the parent node id becomes "5" (node data 71, node 32-1), the first child node id becomes "7" (node data 73, node 32-4), the older brother node id becomes "0", and the younger brother node id becomes "9" (node data 75, node 32-3).

Subsequently, a description will be made in terms of a data structure of the keyword type. In the case of the keyword type, in the data base managing area 22 there is provided a keyword list table 81 as shown in FIG. 8. In the keyword list table 81, there are provided keyword ids automatically given in order of registration of the keywords, a group id to which the keywords belong, and keyword names. The management is effected at every keyword. In addition to the keyword list table 81, a keyword group list table 82 is provided which allows the classification of the keywords for the management. The keyword is set in accordance with the registration by the user and the group name can also be set in accordance with a desire of the user. For actually performing the keyword registration and retrieval of a document, a keyword list as illustrated in FIG. 9 is displayed on the display unit 6. FIG. 10 shows the contents of the keyword list table 81 and the keyword group list table 82 corresponding to the display contents on the display unit 6.

In correspondence with the keyword list table 81, in the document storage area 23 there are set a document data storage section 27 and a document managing table 26 as shown in FIG. 10. The document managing table 26 has the document managing data at every document as well as the box type and the tree type, while each document managing data includes pointers to the document id, document name and document data and the keyword ids of a plurality of keywords for the document. In this embodiment, 6 keywords can be given to one document.

A description will be made hereinbelow with reference to FIGS. 11 to 21 in terms of an operation of the information searching apparatus thus arranged. In the information searching apparatus according to this embodiment, in response to the start of the apparatus, the CPU 1 checks the data base type storage section 21 of the large-capacity storage unit 5 to perform a process in accordance with the data base type. Here, the description will be made in terms of the setting and registering processes of the nodes and keywords at every data base type.

Registration of Box

In FIG. 11, the CPU 1, in a step 1, receives the box name inputted from the inputting section 4, and the CPU 1, in a step 2, newly adds node data into the data base managing area 22. At this time, the value (generally incremented by +1) subsequent to the node id of the node lastly registered is set in that node id, and the value "0" is set in each of the parent node id, the first child node id, the older brother node id and the younger brother node id. Further, the CPU 1, in a step 3, changes the younger brother node id of the node data of the node, lastly registered, to the value of the node id of the newly added node and, in a step 4, changes the older brother node id of the newly added node data to the node id of the node lastly registered. Then, a step 5 follows to check an instruction to additionally register a new node (box). If not, the CPU 1, in a step 6, displays the box list, shown in FIG. 2 on the display unit 6 on the basis of the data in the data base managing area 22.

Production of Tree (Registration of Large Classification, Middle Classification and Small Classification)

In FIG. 12, the CPU 1, in a step 11, receives the classification name (large classification, middle classification and small classification) inputted from the inputting section 4, and in a step 12 checks the data base area 22 as to whether the inputted large classification has already been registered. Only in the case of no registration, the CPU 1, in a step 13, registers a new large classification in the data base managing area 22. Subsequently, the CPU 1, in a step 14, checks whether the middle classification inputted has already been registered. Only in the case of no registration, the CPU 1, in a step 15, registers a new middle classification. Further, the CPU 1, in a step 16, checks whether the small classification inputted has already been registered. In the case of registered, the CPU 1, in a step 18, generates an alarm by a buzzer or the like. On the other hand, in the case of not registered, the CPU 1, in a step 17, registers a new small classification. After the execution of the steps 11 to 18, the CPU 1 displays the tree structure, as illustrated in FIG. 3, on the display unit 6 on the basis of the data within the data base managing area 22.

Here, a description will be made with reference to FIG. 13 in terms of the registration process of the large classification to be effected in the aforementioned step 13. If the decision of the step 12 is that the large classification inputted is not registered, in a step 31 new node data is added into the data base managing area 22. At this time, the node id is set to the value subsequent to the node id of the node data (not limited to the large classification, middle classification and small classification) registered immediately before. Further, the parent node id, first child node id, older brother node id and younger brother node id respectively take "0". The large classification name inputted is set as the node name.

Here, in the case of the tree type, when node data is newly added into the data base managing area 22, "0" is first set as the initial values to the parent node id, first child node id, older brother node id and younger brother node id. The detailed description will be omitted because of being the same.

Further, in steps 32 and 33, the data which is included in the node data within the data base managing area 22 and whose parent node id and younger brother node id are "0" is searched. If existing, the operation advances to steps 34 and 35. That is, in the step 34, the younger brother node id of the node data corresponding to (falling under) the conditions in the step 33 is changed to the value of the node id of the newly added node data, and in the step 35, the older brother node id of the newly added node data is changed to the value of the node id of the node data corresponding to the conditions in the step 33.

Moreover, a description will be made with reference to FIG. 14 in terms of the registration process of the middle classification to be effected in the step 15. If the decision of the step 14 is that the middle classification inputted is not yet registered, a step 41 is executed so as to add new node data into the data base managing area 22. At this time, for the node id, there is set the value next to the node id of the node data (not limited to the large classification, middle classification and small classification) registered immediately before. Then, a step 42 is executed in order to check the first child node id of the node data (the node data of the large classification newly added in the step 13 or the node data of the large classification decided as registered in the step 12) of the large classification to which the node data to be additionally registered belongs. If the value of the first child node id is "0", a step 43 follows to change the first child node id of the node data of the large classification, checked in the step 42, to the value of the node id of the node data newly added in the step 41. If the answer of the step 42 is that the first child node id is not "0" (that is, if the large classification is not a new classification), steps 44 and 45 are executed to search the node data in which the parent node id is equal to the node id of the node data of the large classification to which the node data added in the step 41 belongs and in which the younger brother node id is "0". If the corresponding node data has been found, the operation proceeds to steps 46 and 47. That is, in the step 46 the younger brother node id of the node data corresponding to the conditions in the step 45 is changed to the value of the node id of the node data added in the step 41, and in the step 47 the older brother node id of the node data added in the step 41 is changed to the value of the node id of the node data satisfying the conditions in the step 45.

After the execution of the operation from the step 43 or 44 to the step 47, a step 48 follows to change the parent node id of the node data of the middle classification added in the step 41 to the value of the node id of the node data of the large classification to which that node belongs.

In addition, a description will be made with reference to FIG. 15 in terms of the registration process of the small classification in the step 17. If the decision of the step 16 is that the small classification inputted is not registered, a step 51 is executed so that new node data are added into the data base managing area 22. At this time, the node id takes the value second to the node id of the node data (large classification, middle classification and small classification) registered immediately before. Secondly, a step 52 follows to check the first child node id of the node data of the middle classification (i.e., the node data of the middle classification newly added in the step 15, or the node data of the middle classification decided as registered in the step 14) to which the node data to be additionally registered belongs. If the value of the first child node id is "0", in a step 53 the first child node id of the node data of the middle classification checked in the step 52 is changed to the value of the node id of the node data newly added in the step 51. On the other hand, if in the step 52 the first child node id is not "0" (that is, the middle classification is not new), the operation advances to steps 54 and 55 to search the node data in which the parent node id is equal to the node id of the node data of the middle classification to which the node data added in the step 51 belongs and the younger brother node id is "0". If the node data corresponding to this condition has been found, the operation proceeds to 56 and 57. That is, in the step 56 the younger brother node id of the node data corresponding to the condition in the step 55 is changed to the value of the node id of the node data added in the step 51, and in the step 57 the older brother node id of the node data added in the step 51 is changed to the value of the node id of the node data corresponding to the condition in the step 55.

After the execution of the processes from the step 53 or 54 to the step 57, a step 58 is executed so that the parent node id of the node data of the small classification added in the step 51 is changed to the value of the node id of the node data of the middle classification to which that node belongs.

Registration of Keyword List

In FIG. 16, the CPU 1, in a step 61, receives from the inputting section 4 the keyword name to be newly registered and the group name to which that keyword belongs and, in a step 62, add the keyword data into the data base managing area 22. At this time, the keyword id is set to the value subsequent to the keyword id registered immediately before, and the keyword name is set to the name inputted. Further, a group managing table is checked on the basis of the group name designated and the group id of the corresponding group is set. After the addition of the keyword data, in a step 63 the CPU 1 displays a keyword list, as illustrated in FIG. 9, on the display unit 6.

Although the description has been made above in terms of the registration processes of the classification, keyword and others at every data base type, a further description will be made hereinbelow in terms of an operation to register a document with respect to the data base set.

Box Type

In FIG. 17, the CPU 1, in a step 91, receives a box name and a document name from the inputting section 4 and document data from the image inputting device 8, and in a step 92, searches the node data corresponding to the inputted box name within the data base managing area 22 and, in the step 93, check whether there is the node data corresponding thereto. If so, a step 94 follows to add new document managing data into the document managing table 22. In this case, the value subsequent to the document id of the document registered immediately before is set to the document id, "0" is set to the parent node id, older brother node id and younger brother node id, and the document name inputted in the step 91 is set as the document name. Further, a step 95 is executed in order to check the first child node id (document id) of the corresponding node data checked in the step 93. If the first child node id is "0", in a step 96 the first child node id of the corresponding node data checked in the step 93 is changed to the value of the document id of the document managing data added in the step 94. On the other hand, if the answer of the step 95 is negative, in steps 97 and 98 the document managing data whose parent node id is equal to the node id of the node data satisfying the condition in the step 93 and younger brother document id is "0" is retrieved within the document managing table 24. If there is the corresponding document managing data, the operation advances to steps 99 and 100. That is, in the step 99 the younger brother document id of the document managing data corresponding to the condition in the step 98 is changed to the value of the document id of the document managing data added in the step 94, and in the step 100 the older brother document id of the document managing data added in the step 94 is changed to the value of the document id of the document managing data corresponding to the condition in the step 98.

After the execution of the processes from the step 96 or 97 to the step 100, a step 101 is executed so that the parent node id of the document data added in the step 94 is changed to the value of the node id of the node data (i.e., the small classification to which the document data belongs) satisfying the condition in the step 93.

Tree Type

In FIGS. 18 and 19, when in a step 111 receiving a large classification name, middle classification name, small classification name and document name from the inputting section 4 and document data from the image inputting device 8, in steps 112 and 113 the CPU 1 checks whether the node name of the node data indicated by the first child node id of the node data corresponding to the large classification name inputted is equal to the middle classification name inputted in the step 111. If being equal middle classification name, the operation proceeds to a step 118, and if not equal thereto, the operation advances to steps 114 and 115. The steps 114 and 115 are for retrieving the node data having the node name equal to that middle classification name by following the younger brother node id of the node data. If the node data having the node name equal to the corresponding middle classification name is found in the step 113 or 115, as well as in the steps 112 to 115, the node data having the node name equal to the small classification name inputted in the step 111 is searched in steps 118, 119, 120 and 121. If the corresponding node data has been found in the step 119 or 121, in a step 122 new document managing data is added into the document managing table 24, and then followed by a step 123 to check whether the first child node id of the node data satisfying the condition in the step 119 or 121 is "0". If "0", in a step 124 that first child node id is changed to the value of the document id of the document managing data added in the step 122. On the other hand, if in the step 123 the first child node id is not "0", the operation advances to steps 125 and 126 so as to search, in the document managing table 24, the document managing data that the parent node id is equal to the node id of the node data corresponding to the condition in the step 119 or 121 and the younger brother node id is equal to "0". If that document managing data has been found, the operation proceeds to steps 127 and 128. That is, in the step 127 the younger brother document id of the document managing data satisfying the condition in the step 126 is changed to the value of the document id of the document managing data added in the step 122, and in the step 128 the older brother document id of the document managing data added in the step 122 is changed to the value of the document id of the document managing data corresponding to the condition in the step 126.

After the execution of the processes from the step 124 or 125 to the step 128, in a step 129 the parent node id of the document managing data added in the step 122 is changed to the value of the node id of the node data (the small classification to which the document newly registered belongs) corresponding to the condition in the step 119 or 121. Then, the CPU 1, in a step 130, writes the image data inputted in the step 111 in the document data storage section 25 of the large-capacity storage unit 5 and, in a step 131, sets the storage address thereof as a pointer in the document managing data.

Keyword Type

In FIG. 20, the CPU 1, in a step 141, receives a keyword name and a document name from the inputting section 4 and document data from the image inputting device 8 and then, in a step 142, adds new document managing data into the document managing table 24. At this time, the value subsequent to the document id of the document registered immediately before is set to the document id of the document managing data, "0" is set to the keyword id, and the document inputted in the step 141 is set as the document name. Secondly, the CPU 1, in a step 143, converts the keyword name inputted in the step 141 into the keyword in with reference to the keyword managing table and sets it in the document managing data. Thereafter, in a step 144 the document data inputted in the step 141 is written in the document data storage section 25 of the large-capacity storage unit 5, and in a step 145 that storage address is set as a pointer in the document managing data.

Although the keyword input in the step 141 is effected on the basis of the keyword list as shown in FIG. 9, in this embodiment 6 keywords can be given to one document to allow the selection of a plurality of keywords in the same group from the keyword list with respect to one document, for example, "Seat"="Tokyo", "Seat"="Osaka", "Charge"= "6,000 Yen", Used Card"="A Co., Ltd", "Used Card"="D Co., Ltd".

As described above, the registration process of the document is effected in accordance with each of the data base types, and the document registered can easily be searched by designating the box name, classification name and keyword name. The CPU 1 retrieves the large-capacity storage unit 5 in accordance with the retrieval conditions inputted through the inputting section 4 and displays a list of the corresponding documents on the display unit 6 and outputs the document designated in that list to the printer 7.

This embodiment can finely perform the document management on the basis of the tree and keyword type managing methods concurrently with presenting an easy operating environment on the basis of the box type managing method. When initializing the disc in the large-capacity storage unit 5, the operator can select a desired data base type to perform the document management in accordance with an appropriate managing method suitable for the data to be managed.

Here, after a document is once registered in accordance with one data base type, there is the possibility that it is found that the document is more preferable to be managed in accordance with a different data base type. In this case, it is desired to change the data base type even after the registration of the document. Such changing processes will be described hereinbelow with reference to FIGS. 21 and 22.

Change from Box Type to Tree Type

In FIG. 21, in response to an instruction from the inputting section 4, the CPU 1 executes a step 151 to retrieve the data base managing area 22 and then executes a step 151 to read out the node name (box name) from the node data (initially, the node data having the node id="1") and display it on the display unit 6. In this state, a step 153 is executed to wait the input from the inputting section 4 and obtain the middle classification name and the small classification which belong to the node name displayed on the display unit 6. Subsequently, the CPU 1, in a step 154, adds new node data into the data base managing area 22 and sets the node name thereof as the middle classification name inputted in the step 153. Further, the CPU 1, in a step 155, similarly adds node data to set the node name thereof as the small classification name inputted in the step 153. After the addition of the two node data, in a step 156 the first child node id of the node data added in the step 155 is changed to the value of the first child node id (i.e., document id) of the node data whose node name has been displayed in the step 152, and in a step 157 the first child node id of the node data added in the step 154 is changed to the value of the node id of the node data added in the step 155. Moreover, in a step 158 the first child node id of the node data whose node name has been displayed in the step 152 is changed to the value of the node id of the node data added in the step 154. The processes from the step 151 to the step 158 are effected with respect to all node data registered on the basis of the box type. After the completion of these processes, in a step 160 the data base type name stored in the large-capacity storage unit 5 is changed from the box type to the tree type, thereafter terminating the operation.

Change from Box Type to Keyword Type

In FIG. 22, in response to an instruction from the inputting section 4, the CPU 1, in a step 161, clears the data base managing area 22 of the large-capacity storage unit 5 and, in a step 162, produces a keyword list within that data base managing area 22 as well as described above. Secondly, the CPU 1, in a step 163, clears the parent node id, older brother node id and younger brother node id of all the document managing data in the document managing table to "0", and finally, in a step 164, changes the data base type name in the large-capacity storage unit 5 from the box type to the keyword type, thereafter terminating the operation.

Although in this embodiment the change from the tree type to the keyword type is allowed, the operation therefor is similar to the operation for the change from the box type to the keyword type, the description thereof will be omitted for brevity. Further, the change from the tree type or the keyword type to the box type can easily be effected from the above description.

As described above, this embodiment can present the three kinds of data bases (box, tree and keyword types) to select an adequate operating environment in accordance with the kind of data managed by the operator and the operating level of the operator. In addition, since the area assignment of the data within the disc is made with the same format with respect to all the types of the data bases, the change between the data base types can easily be performed. Particularly, in the change from the box type to a different type, the document data can easily be registered on the basis of the box type and then the management method can be changed to a fine managing system. That is, it is possible to present an extremely effective working method.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An information searching apparatus comprising:

first storage means for storing data representing documents;

second storage means for storing data representing classification labels, data representing hierarchy relations, and data representing corresponding relations, the classification labels being associated to the documents, the hierarchy relations representing relations between the classification labels, the corresponding relations representing correspondence relations between the data representing the documents and the data representing the classification labels;

selecting means for selecting one of a tree type classification system comprising a plurality of hierarchies and a box type classification system comprising a single hierarchy as a selected classification system;

changing means for changing a form of visualizing the classification labels based on the hierarchy relations in response to the selected classification system, the form being determined by the classification system;

visualizing means for displaying the classification labels in the form; and retrieving means for retrieving the data representing the document based on the corresponding relations.

2. The information searching apparatus according to claim 1, further comprising setting means for setting the classification labels, the hierarchy relations, and the corresponding relations in the second storage means.

* * * * *